United States Patent [19]

Kanda

[11] Patent Number: 4,708,402

[45] Date of Patent: Nov. 24, 1987

[54] BRAKE SIGNAL CONVERSION DEVICE FOR RAILWAY CARS

[75] Inventor: Osamu Kanda, Kobe, Japan

[73] Assignee: Nippon Air Brake Co., Ltd., Kobe, Japan

[21] Appl. No.: 868,235

[22] Filed: May 28, 1986

[30] Foreign Application Priority Data

May 31, 1985 [JP] Japan .............................. 60-83182[U]

[51] Int. Cl.$^4$ ............................................. B60T 17/00
[52] U.S. Cl. ........................................................ 303/20
[58] Field of Search ............... 246/187 A, 187 C, 189, 246/192, 196; 303/15, 16, 20; 318/370; 364/426

[56] References Cited

U.S. PATENT DOCUMENTS

| | | | |
|---|---|---|---|
| 3,539,226 | 11/1970 | Barber | 303/20 |
| 3,778,813 | 12/1973 | Bull | 303/20 X |
| 3,799,623 | 3/1974 | Wickham et al. | 303/20 |
| 3,868,150 | 2/1975 | Maskery | 303/20 |

Primary Examiner—Duane A. Reger
Attorney, Agent, or Firm—G. J. Falce

[57] ABSTRACT

In a brake signal converter device for a railway car a first signal conversion circuit is operative in response to a brake signal issued from the control stand of a first car in a form suitable for use by the first car and converts this brake signal to a form suitable for use by a second car and transmits it to the second car, while a first detector senses the brake commands issued at the first car and isolates the first car from these brake commands transmitted to the second car by means of a first switching section. In addition, brake signals issued from the second car are converted by a second signal conversion circuit to a form suitable for use by the first car and are transmitted to the first car, while a second detector senses the brake commands issued from the second car and isolates the second car from these brake commands transmitted to the first car by a second switching section.

18 Claims, 9 Drawing Figures

PRIOR ART

FIG.8

PRIOR ART

FIG.9

BRAKE SIGNAL CONVERSION DEVICE FOR RAILWAY CARS

BACKGROUND OF THE INVENTION

The invention relates to a brake signal conversion device which is used in combined operations involving railroad cars with different brake signal modes, in which the brake signals for one of the cars are converted to make them suitable for use by cars of a different brake signal mode on the same side, by converting the signals in a device in which, when a brake signal is output by one of the cars, it is converted and transmitted to the other car, and at the same time, has the ability to prevent the transmission of brake signals from the second car back to the first car.

THE PRIOR ART

Figure 8:
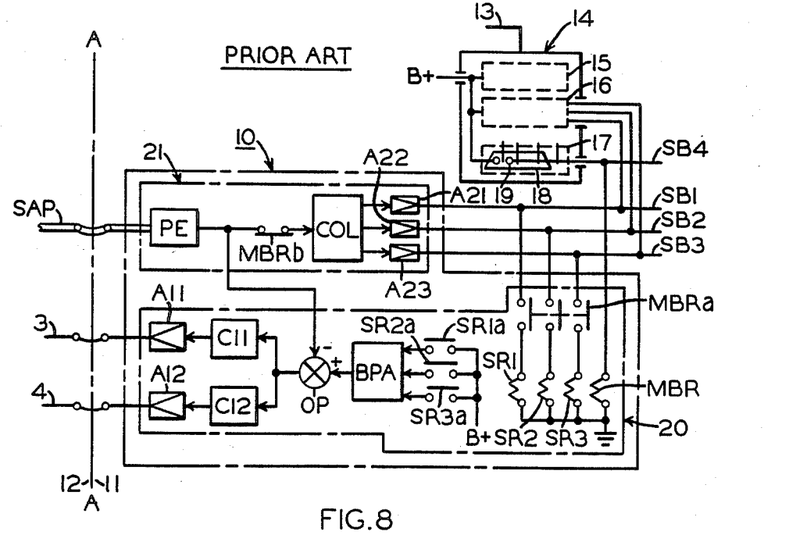
FIG. 8 and FIG. 9 are circuit diagrams of the brake signal conversion devices of the prior art.
Figure 9:
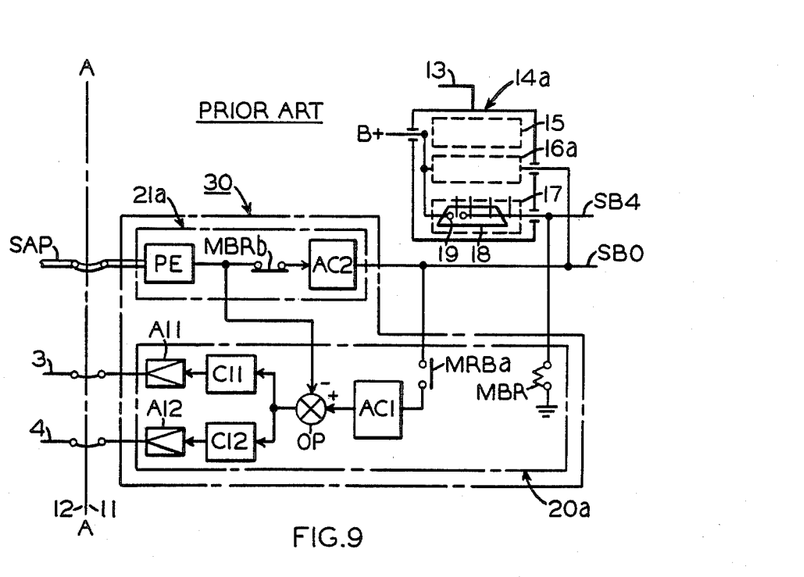

An example of the prior art is shown in FIG. 8 and FIG. 9.

FIG. 8 shows a brake signal conversion device which is used when an electromagnetic direct communication mode car (second car) is connected to a digital electric signal mode car (first car). This conversion device 10 is installed on the digital electric signal mode car 11 to the right of the car connecting section shown by line A—A in the figure, and the electromagnetic direct communication mode car 12 is connected by the release signal line 3, brake signal line 4, and direct communication line SAP.

The electric signal mode car 11 is equipped with a master controller (hereinafter abbreviated mascon) 14, which is operated by a handle 13 on the operating console, and said master controller 14 is made up of the operating controller 15, the brake controller 16 and the detection section 17. There are three cams in the brake controller 16 which operate a switch which opens and closes three (3) sets of brake signal lines SB1, SB2 and SB3, respectively, and this combination of openings and closings produces seven (7) steps of variation of the braking force. The detection section 17 detects when the handle 13 is controlling, i.e., it detects the difference between a released position, a braked position, and a "handle removed" position, and is made to transmit said information through electric signals passing through line SB4 and is comprised mainly of detection cam 18 and switch 19, in which switch 19 is open in the above-mentioned "handle removed" position, and closed in said released and braked positions, and connects the power source and detection passing through line SB4.

The details of the electromagnetic direct communication mode car 12 are not shown, but is provided with the direct communication line SAP, release signal line 3, and brake signal line 4, and by operating these, i.e., by manipulating the brake valve from the control console, it is made to transmit the specified signal. Furthermore, the direct communication line SAP is connected to the intermediate control valve while the release signal line 3 is connected to the solenoid of the release solenoid valve, and the brake signal line 4 is connected to the solenoid of the brake solenoid valve.

The conversion device 10 consists of a first conversion circuit 20 and a second conversion circuit 21. The first conversion circuit 20 converts the brake signals emitted from the control console of the digital electric signal mode car 11 to a form suitable for the electromagnetic direct communication mode car 12, and are transmitted through the brake signal line 4 and the release signal line 3, while the second conversion circuit 21 converts brake commands emitted from the control console of the electromagnetic direct communication mode car 12 to a form suitable for use by the digital electric signal car wheel 11 and transmits them through the brake signal lines SB1, SB2 and SB3.

Now let us assume that a brake signal is issued from the side of the electromagnetic direct communication mode car 12. This brake signal is the pressure in the direct communication line SAP, so that the pneumatic-electric converter PE of the second conversion device generates an output which corresponds to the pressure. This output travels through the normally-closed contact MBRb of the detector relay MBR, and is input to the comparative logic circuit COL and the comparative logic circuit COL complies with said air pressure, and puts out a signal conforming to one of the seven (7) steps, numbered one through seven, via the signal lines SB1, SB2 and SB3, as digital signals. In other words, said comparative logic circuit divides the pressure in the direct communication line SAP into steps. In the figure, A21, A22 and A33 are amplifiers. In this status, the detector relay MBR is in a state in which the operating status of the electric signal mode car 11 is not being used, so that the detector section 17 detects the removal position, and leaves the switch 19 in the open position, and is in a de-energized state. As a result, said normally-closed contact MBRb is closed, while the normally-open contact MBRa remains open. When contact MBRa is open, the transmission relays SR1, SR2 and SR3 are also in a de-energized state, and there is no input of any brake signal from the side of the electric signal mode car 11 for reverse transmission to the electromagnetic direct communication mode car 12 side.

In contrast to what was described above, let us assume that the brake signals are issued from the electric signal mode car side 11. This brake signal is put out through signal lines SB1, SB2 and SB3, and at the same time, the detector 17 detects the presence of the normal brake position, so that switch 19 will be closed and the detector relay MBR is energized. This causes the normally-open contact MBRa to close, and the brake signal lines SB1, SB2 and SB3 are connected to the first conversion circuit 20, and in accordance with the brake signals, the transmission relays SR1, SR2 and SR3 are energized or de-energized so that the normally-open contacts SR1a, SR2a, and SR3a assume open or closed positions, depending on the brake signal, and the brake commands are transmitted to the pattern generator BPA. The pattern generator BPA generates outputs according to one of the seven (7) brake control steps, and the outputs corresponding to these brake commands are sent to the computer OP as analog signals. The computer OP subtracts the output of the above-mentioned pneumatic-electric converter PE from the output of the pattern generator BPA and generates the difference, which is input to comparators C11 and C12.

The comparators C11 and C12 pass the output of the computer OP through respective amplifiers A11 and A12, and then send it to the release signal line 3 and the brake signal line 4. In addition, when a brake signal is issued from the control console 14, the detector relay MBR is energized, so that the normally-closed contact MBRb is open, and the pneumatic-electric converter PE output is added to the comparative logic circuit COL, and there is no change for the brake signal lines SB1, SB2 and SB3 to be de-energized.

FIG. 9 shows the brake signal conversion device where the electromagnetic direct communication mode car 12 (second car) and the analog electric signal mode car (13) are combined. This conversion device 30, of the type shown in FIG. 8, differs in that its brake signal is different from the analog signal, and consequently the voltage, frequency and pulse width, along with the brake signal line SB0 due to the analog converter AC from the output of the pneumatic-electric converter PE in the second conversion circuit 21a are output as analog signals to the brake signal line SB0, and the brake signal of the first conversion circuit 20a is converted to an output by the computer OP in the form of analog signals. At the same time, the principal controller 14a is the same as the one illustrated in FIG. 8, except that the brake controller 16a has a brake signal which is output as an analog signal. No explanation is given for FIG. 9, because the sections which are identical to those in FIG. 8 are identified by the same numbers and symbols.

The conversion device 30 is approximately the same as the control device 10, in that the first conversion circuit 20a transmits brake signals issued from the control console of an electric signal mode car 13a, converted in accordance with the electromagnetic direct communication mode car 12, and sends them through the signal line 4 and the release signal line 3, and the brake commands issued from the operating console of the electric direct communication mode car 12 are converted to something suitable for use by an analog electric signal car 13, and then sent to the brake signal line SB0.

Problems this invention seeks to solve

On brake signal conversion devices of the prior art, the car which issues the brake signal and the converted brake signal which is received by the car are evaluated and converted into a form for reliable transmission of the brake signal, but as a result, the cam 18 and switch 19 comprising the detection section 17 were made necessary in addition to the main controller 14 or 14a, along with the detection line SB4 and detection relay MBR which were also necessitated. In addition, as a general rule recently, there are many cases in which the brake controller 16 or 16a and the detector section 17 comprising the brake controller are unitized with the operation controller 15, and are present in the form of the main controller 14 or 14a.

This type of main controller demands miniaturization, and for that, the reduction of the number of cams is an effective means. In such cases, detection cam 18 has become a candidate for omission.

At the same time, where the extension line is concerned, there is a spectacular increase in their number accompanying the improvement in car efficiency. As a result, the need for economy and compact design dictates their elimination.

When these types of minaturization of the main controller and the reduction in the number of lines are taken up as problems, their cause is the car which generates the brake signal and the car which converts this signal, which require the establishment of a dedicated line SB4 to perform evaluations between these cars.

This is why the invention eliminates the line SB4, which represented a disadvantage in the prior art.

Means of solving these problems

The means used by the invention to solve the problems of the prior art is to take cars with different brake signal modes between a first car and a second car (e.g., an electrically operated brake and a pneumatically operated brake) in a combined state, in which the brake signal from the first car is converted to a brake signal suitable for use by the second car, and the brake signal from the second car is converted to a form suitable for use by the first car, by respective first and second conversion circuits which are included in the brake signal conversion device for railroad car use, characterized by a first detector section to detect the brake signal output from the first car mounted in the first conversion circuit. Information received by this first detector section is used to shield the brake command circuit to the first car by installation of a first switching section in the second conversion circuit, together with the installation of a second detector section within the second conversion circuit to detect that brake signals have been issued for the second car, and based on this information picked up by said second detector section, there is a second switching section within the first conversion circuit to shield the brake signal pathway.

DESCRIPTION AND OPERATION

Figure 1:
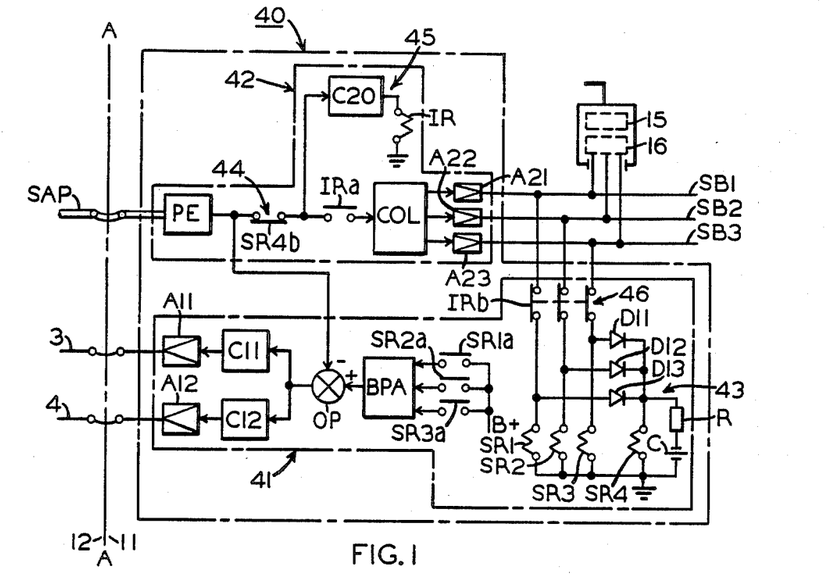
FIG. 1 shows one embodiment of the invention.

FIG. 1 illustrates the first embodiment. This embodiment is the brake command read-convert device 40 in the case in which a first mode brake control signal from the digital electric commnd type car (the first car) 11 and a second mode brake control signal from the electromagnetic direct type car are connected. This read-convert device 40 consists of the first read-convert circuit 41 and the second read-convert circuit 42, and the point where it differs from the read-convert device 10 of the prior art illustrated in FIG. 8 is the fact that the first switching portion 44, the second detecting portion 45 and the second switching portion 46 are provided to replace the line which connects to the existing detection input line SB4, the detection relay MBR which is connected to the above-mentioned line, the normally-open contact MBRa, and the normally-closed contact MBRb.

The first detecting portion 43 is inside the first read-convert circuit 41, and it consists of the diodes D11, D12 and D13, which are connected in the middle of the lines which connect each brake command line SB1, SB2, SB3 to the transfer relay, SR1, SR2, SR3 and the first detection relay SR4 which is connected between the diodes and ground and the delay circuit in which the resistor R and the capacitor C are connected in series, and then this is connected to the first detection relay SR4 in parallel. The normally-closed contact SR4b of the first detection relay SR4 is inserted between the point where the output line of the pneumatic-electric converter PE inside the second read-convert circuit 42 branches off to the operator OP as the first switching portion 44, and the point where the same output line branches off to the second detection portion 45.

In the second detection portion 45, the comparator C20 and the second detection relay IR are connected in series, and this is inserted between the line which branches off from the output line of the pneumatic-electric converter PE, after the first switching portion 44 and the ground.

The contacts of the second detection relay IR are the normally-open contacts IRa and the three-layered, normally-closed contacts IRb. The normally-open contact IRa is inserted just ahead of where the output line of the pneumatic-electric converter PE connects to the comparative logic circuit COL. The normally-closed contact IRb is provided as the second switching portion 46 inside the first read-convert circuit 41, and it is inserted between the point diverging from the brake command lines SB1, SB2 and SB3 and the point where the transfer relays SR1, SR2 and SR3 connect to the diodes D11, D12 and D13. The other parts are the same as the read-convert device 10 in FIG. 10, so that they are indicated by the same numbers and symbols, and have not been explained in any further detail.

In this read-convert device 40, when the second mode brake control signal is sent from the side of the electromagnetic direct type car 12, the output of the pneumatic-electric converter PE of the second read-convert circuit 42 is input into the comparator C20 of the second detection portion 45 via the normally-closed contact SR4b of the first switching portion 44.

The comparator C20 is for the detection of the presence or absence of the brake command from the electromagnetic direct type car 12, and since the resolution of the comparative logic circuit COL is a seven-step affair, the detection level is set slightly lower than 1/7 of the maximum value of the brake command. When the comparator C20 detects the brake command, it outputs and by this output the second detection relay IR is activated, so that the normally-open contact IRa is closed, and the output of the pneumatic-electric converter PE is converted to the stepwise digital signal which corresponds to the comparative logic circuit COL, and is transferred to the brake command line SB1, SB2, SB3 via the amplifiers A21, A22 and A23.

In addition, since the normally-closed contact $IR_b$ which is the second switching portion 46, is opened by the activation of the second detection relay IR, the connection from the brake command lines SB1, SB2 and SB3 to the first read-convert circuit 41 is blocked.

When the first mode brake control signal is sent from the side of the digital electric command style car 11, the brake command is transferred to the first read-convert circuit 41 from the brake command lines SB1, SB2 and SB3, via the normally-closed contact $IR_b$ which is the second switching portion 46. This brake command is transferred, as indicated in FIG. 8, to the release command line 3 and the brake command line 4, via the transfer relays SR1, SR2 and SR3, their normally open contact SR1a, SR2a and SR3a, the pattern generator BPA, the operator OP, the comparator C11 and C12, and the amplifier A11 and A12. At this time, the first detection portion detects the brake command by the activation of the first detect relay SR4.

Consequently, the normally-closed contact SR4b, which is the first switching portion 4, opens. The resistor R of the first detection portion 43 and the capacitor C form the delay circuit, and it deactivates the first detection relay SR4, slightly later than the brake release command, so that the closing action of the normally-closed contact SR4b is delayed.

Consequently, the time which is required for the completion of the exhaust of the direct line SAP, when the brake release command is sent, is secured, and the normally-closed contact, SR4b, is closed after the output of the pneumatic-electric converter PE has disappeared.

Therefore, there is no chance for the output of the pneumatic-electric converter PE during the release period to be transferred to the brake command lines SB1, SB2 and SB3. This causes the discharge of air from the direct communication line SAP when a brake release signal is issued, and the time for this discharge of air is provided while, when the output of the pneumatic-electric converter PE takes place, then the normally-closed contact SB4 closes. Consequently, there is no chance for the pneumatic-electric converter PE output to be transmitted to the brake signal lines SB1, SB2 and SB3 during the release period.

Figure 6:
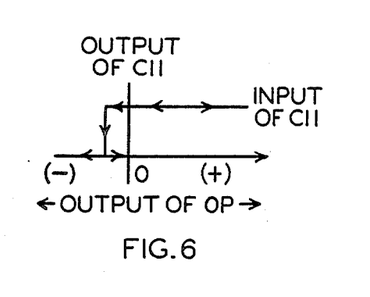
FIG. 6 is an input-output characteristics diagram of the comparator C11.
Figure 7:
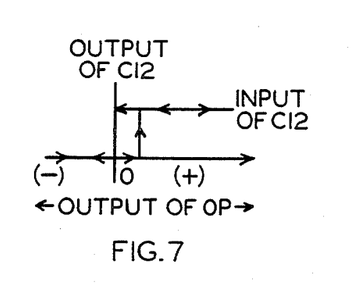
FIG. 7 is an input-output diagram of the comparator C12.

Furthermore, the output properties with respect to the input of comparators C11 and C12 are as pictured in FIG. 6 and FIG. 7. In other words, when the input to comparator C11 (output of computer OP) goes from negative to positive values, once it passes the zero point, it produces a specified output, and when the input decreases from positive to negative, a bit after the zero point is passed, the output will become zero, which is a negative side hysteresis loop characteristic (FIG. 6), and as the input increases from negative to positive values, it will output a specified value as it passes to zero point. The comparator 12 has the characteristic that, when the input signal decreases from positive to negative and passes the zero point, it has a hysteresis loop (FIG. 7), for adjustments on the positive side. This causes the first mode brake control signal to be transmitted to the electromagnetic direct communication mode car, whereupon its brake valve becomes the same as when a brake control operation is conducted, and thereby prevents the unnecessary loss of compressed air.

Figure 2:
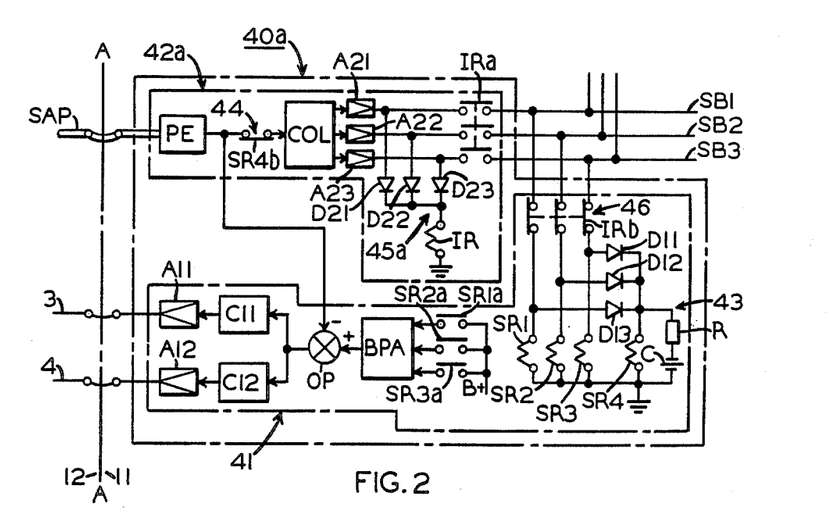
FIG. 2 shows a second embodiment.

The second embodiment is illustrated in FIG. 2. This embodiment uses the same brake signal conversion device 40a as in the first embodiment, in which a first brake control signal of the digital electric signal mode car (first car) 11 and a second brake control signal of the electromagnetic direct communication mode car (second car) 12 are combined, and the difference from the first example is the second detector section 45a of the second conversion circuit 42a. The connection sites of the second detector section 45a of the second detector relay IR shift to the output side of amplifiers A21, A22 and A23 to make possible the replacement of comparator C20 of the second detector section 45 in embodiment 1. This is accompanied by normally open contact IRa of the second detector relay IR being a 3 series item, installed to shield brake signal lines SB1, SB2, and SB3 after the contacts of said diodes D21, D22 and D23 to the output side of the amplifiers A21, A22 and A23. The rest is the same as in the first embodiment and the same items are identified by the same symbols and numbers, so further explanations have been omitted.

Figure 3:
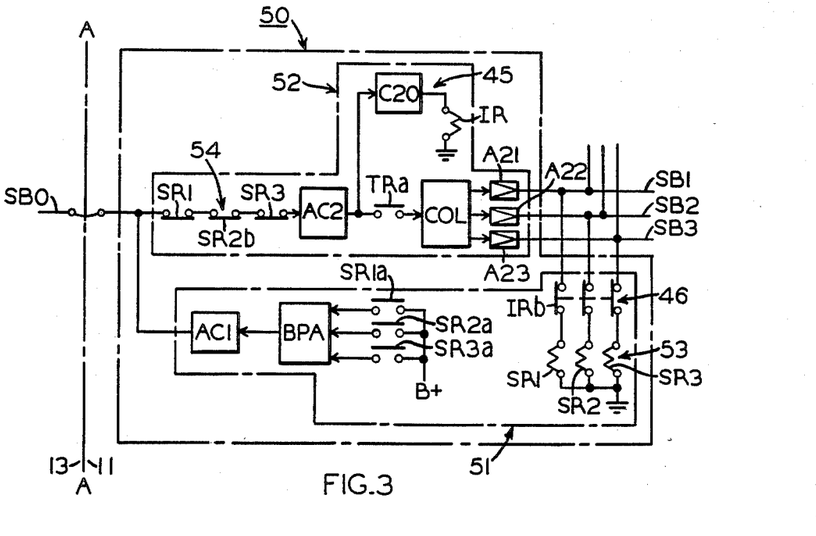
FIG. 3 a third, and
FIG. 4 a fourth.

FIG. 3 shows the third embodiment. This example shows the brake signal conversion device 50 with combined connections to hook up the first mode, brake control signal from the digital electric signal mode car (first car) 11 and the second mode brake control signal from the analog electric signal mode car (second car) 13. This conversion circuit 50 consists of the first conversion circuit 51 and the second conversion circuit 52, and the main difference from the first embodiment is that the second car is an analog electric signal mode car 13, so that the car communication section between A—A is connected to the brake signal line SB0, and said brake signal line SB0 is connected to the output side of the first conversion circuit 51 and the input side of the second conversion circuit 52, and the first detector section 53 and the first switching section 54 are formed in accordance with this. An analog computer AC1 is installed in place of the computer OP, and comparators C11, C12 and C13 and the pneumatic-electric converter PE are replaced by the analog converter AC2.

The first detector section 53 is located in the first conversion circuit 51, and the respective brake signal lines SB1, SB2 and SB3 of the second switching section 46 (with the same normally-closed contact IRb) are used, along with transmission relays SR1, SR2 and SR3 in the invention.

The first switching section 54 is connected to the input terminal of the second conversion circuit 52, and the energizing of the joint transmission first detector relays SR1, SR2 and SR3, respectively, operates normally-closed contacts SR1b, SR2b and SR3b, which are connected in direct series.

The analog converter AC1 converts the output of the pattern generator BPA (the same as in the first figure), to an analog signal suitable for brake signal line SB0 (in voltage, frequency, pulse width, etc.).

The other items are the same as in the first embodiment, illustrated in FIG. 1, and are shown with the same identifying symbols and numbers, so no further explanation is given here.

When a first mode brake control signal is issued from the side of the digital electric signal mode car 11, this conversion device 50 transmits brake signals for the brake signal lines SB1, SB2 and SB3 through the normally-closed contact IRb which is the second switching section 46 to the first conversion circuit 51. This brake signal passes through the joint transmission lines of the first detector section relays SR1, SR2 and SR3, the normally-open contact points SR1a, SR2a and SR3a, pattern generator BPA, and analog converter AC1 to be transmitted to the brake signal line SB0. At this point, the first detector section 53 detects the fact that the brake signal has been issued by energizing at least one of the joint transmission first detector section relays SR1, SR2 and SR3. This causes the opening of the corresponding normally-closed contacts SR1a, SR2a and SR3a, and the input from the brake signal line SB0 side to the second conversion circuit is shielded.

When brake commands are issued for the side of the analog electric signal mode car 13, a second mode brake control signal is transmitted from the brake signal line SB0 to the second conversion circuit 52 through normally-closed contacts SR1b, SR2b and SR3b of the first switching section 54. This brake signal passes through the analog converter AC2, after which it is transmitted to the brake signal lines SB1, SB2 and SB3 in a manner similar to that explained for the first embodiment. Furthermore, the normally-open contact IRa is closed by the action of the second detector relay IR, and simultaneously the normally-closed contact IRb (second switching section 46) is opened.

Figure 4:
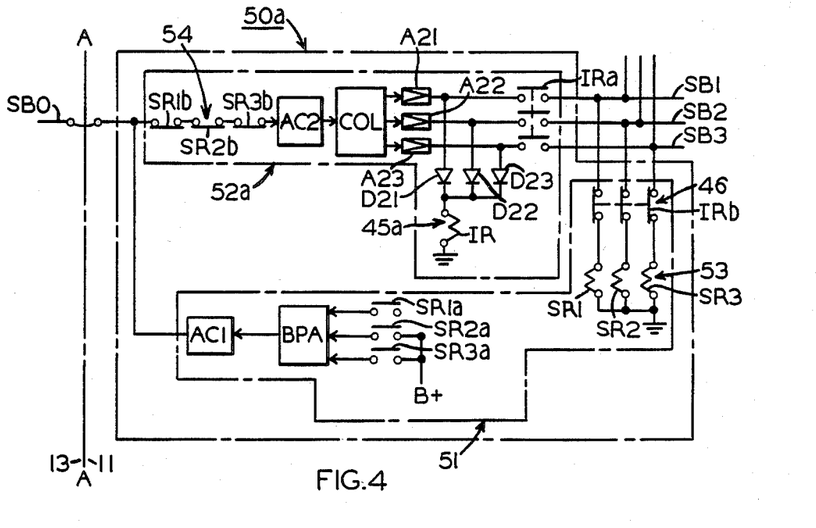

A fourth embodiment is illustrated in FIG. 4. This embodiment is similar to the third example in that when the first mode brake control signal from the digital electric signal mode car (first car) 11 and the second mode brake control signal from the analog electric signal mode car (second car) 13 are connected together, there is a brake signal conversion device 50a, and the point where this differs from the third embodiment is that the second detection section 45a is the same as the second embodiment (FIG. 2), so that the various sections are identified by the same symbols. Here again, as shown in the second embodiment, the contacts of the second detector relay IR are shifted on the output side to amplifiers A21, A22 and A23, and the comparator C20 of the third embodiment is replaced by diodes D21, D22 and D23. Similarly, this is accompanied by making the normally-open contact point IRa of the second detector relay IR one of a 3-series, and after the contact points of diodes D21, D22 and D23 of the output side of amplifiers A21, A22 and A23, there are brake signal lines SB1, SB2 and SB3 in a shielded manner. Otherwise, the fourth embodiment is the same as in the third embodiment, and the same symbols are used to identify identical sections, for which reason further explanations have been omitted. FIG. 52a also shows the second conversion circuit.

Figure 5:
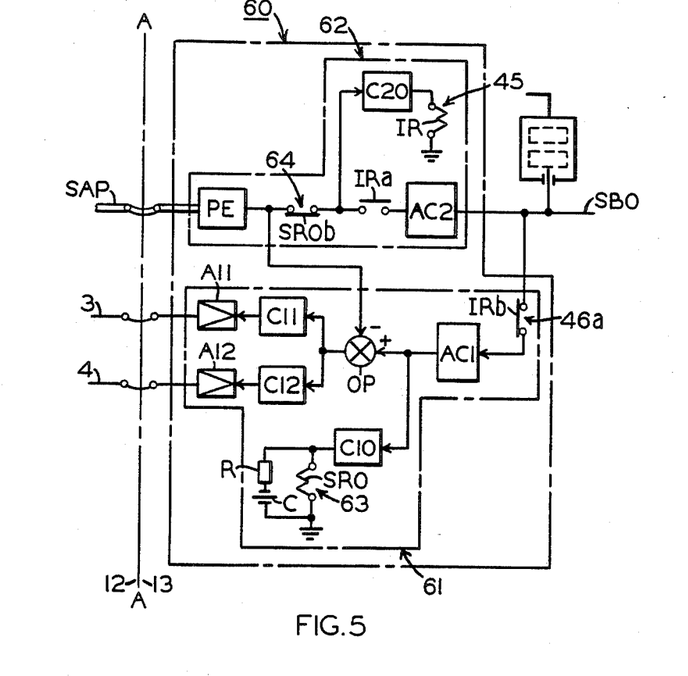
FIG. 5 is a circuit diagram of the respective sections of the fifth embodiment of the invention.

The fifth embodiment is illustrated in FIG. 5. This example shows the brake signal conversion device 60, which combines the first mode brake control signal from the analog electric signal mode car (first car) 13 and the second mode brake control signal from the electromagnetic direct communication mode car (second car) 12. This conversion device 60 is comprised of a first conversion circuit 61 and a second conversion circuit 62. The first conversion circuit 61 includes a first detector section 63 and second switching section 46a, and the second conversion circuit 62 includes the first switching section 64 and the second detector section 45.

The first conversion circuit 61 is connected to the input side from the brake signal line SB0, where it branches off, and its input side has the normally-closed contact IRb, which opens when the second detector relay IR is energized by the second switching section 46a, and it passes through the analog converter AC1 to be connected to the computer OP and the comparator C10. The computer OP is connected separately to the output side of the pneumatic-electric converter PE of the second conversion circuit 62. The output side of the computer OP branches off to comparators C11 and C12, and they output respectively via amplifiers A11 and A12 and then out of the first conversion circuit 61, while the electromagnetic direct communication mode car 12, which is the second car, is connected to the release signal line 3 and the brake signal line 4.

The design following the computer OP is the same as those shown in the illustrations of the first and second embodiments, so that detailed descriptions are omitted here. Said comparator C10 evaluates analog command, i.e., it evaluates the presence or absence of brake commands, and the first detector relay SR0, resistance R and capacitor C connected to its output side along with the first detector section 63 make up this section. This resistance R and capacitor C are the same as those used in the first embodiment, and comprises the delay circuit.

The second conversion circuit 62 is connected to the input side through the tube connected to the direct communication tube SAP of the electromagnetic direct communication mode car 12 of the second car, and the pneumatic-electric converter PE is installed at the input terminal in the same manner as shown in the first embodiment. The output side of this pneumatic-electric converter PE branches off in two directions, with one direction connected to the above-mentioned computer OP, and the other direction connected to the brake signal line SB0 after passing through the normally-open contact IRa and the analog converter AC2. Its first switching section 64 is made of the normally-closed contact SR0b, which opens upon energizing by the above-mentioned first detector relay SR0. The line between the normally-closed contact SR0b and the normally-open contact IRa is successively connected by the comparator C20, second detector relay IR, and the ground in the same manner as shown in the first embodiment.

Furthermore, the analog converters AC1 and AC2 are for the purpose of converting the input to analog codes suitable for use by the computer OP and the brake signal line SB0.

When the second mode brake control signal is issued from the side of the electgromagnetic direct communication mode car 12, this conversion device 60 will have the output from the pneumatic-electric converter PE of the second conversion circuit 62 pass through the normally-closed contact SR0b of the first switching section 64, to be input into the comparator C20 of the second detector section 45. This will cause the comparator C20 to detect the brake signal and output said information, and the second detector relay is energized. This causes the normally-open contact IRa to close, and the output from the pneumatic-electric converter PE is transformed into an analog signal suitable for the brake signal line SB0 and is transmitted. At the same time, the energizing of the second detector relay IR opens the normally-closed contact IRb which is the second switching section 46a, and the contact between the brake signal line SB0 and the first conversion circuit 61 is shielded.

When the first mode brake control signal is issued from the side of the analog electric command mode car 13, said brake signal travels through the brake signal line SB0, then through the normally-closed contact IRb which is the second switching section 46a of the first conversion circuit, and is input to the analog converter AC1. The output of the analog converter AC1 is applied to the computer OP and the first detector section 63. The computer OP operates in the same manner as described in the first example and uses comparators C11 and C12 as well as amplifiers A11 and A12 to transmit brake commands to brake signal line 4. At the first detector section 63, the energizing of the first detector relay SR0 detects the fact that a brake signal has been issued, which causes the normally-closed contact SR0b of the first switching section 64 to open, and make contact with the brake signal line SB0 to the output side of the pneumatic-electric converter PE, and the second detector section 45 is shielded.

Any of the above-mentioned brake signal conversion devices 40, 40a, 50, 50a, and 60 in embodiments 1 to 5 determine the transmission direction of the brake signal generated previously, and convert the brake signal to a form suitable for use by the car on the other side, and with regard to the direction of transmission, it has a two-way mode, so that it can be used when two types of brake commands are generated simultaneously or where, under normal circumstances, where a special brake signal is generated by itself, or when, during the course of a signal formation, two or more cycles of conversion operations are conducted, to change the status of the brake signal mode car connection (e.g., where an electromagnetic direct communication mode car/digital electrical signal mode car/electromagnetic direct communication mode car are connected in succession).

EFFECT OF INVENTION

According to this invention, the detector line which was necessary in the past has been eliminated. This makes possible the elimination of the detection cam, which was bulky and had to be installed on the main controller, and the elimination of this part makes the main controller that much smaller.

| | NOMENCLATURE |
|---|---|
| 3 | release signal line |
| 4 | brake signal line |
| 11 | digital electric signal mode car |
| 12 | electromagnetic direct communication mode car, |
| 13 | analog electric signal mode car |
| 14 | main controller |
| 15 | operating controller |
| 16 | brake controller |
| 40, 40a, 50, 50a, 60 | brake signal conversion device |
| 41, 51, 61 | first conversion circuit |
| 42, 42a, 52, 52a, 62 | second conversion circuit |
| 43, 53, 63 | first detector section |
| 45, 45a | second detector section |
| 46, 46a | second switching section. |

I claim:

1. A brake signal conversion device for a railway train having a first railway car with a brake system operative in response to a brake control signal in a first signal mode and having a second railway car coupled to said first car with a brake system operative in response to a brake control signal in a second signal mode comprising:
   (a) first signal conversion means operative for receiving said first mode brake control signal and converting said first mode brake control signal to said second mode brake control signal;
   (b) second signal conversion means operative for receiving said second mode brake control signal and converting said second mode brake control signal to said first mode brake control signal;
   (c) first detector means operative in response to said first mode brake control signal for rendering said second signal conversion means inoperative to effect said conversion of said second mode brake control signal to said first mode brake control signal;
   (d) second detector means operative in response to said second mode brake control signal for rendering said first signal conversion means inoperative to effect said conversion of said first mode brake control signal to said second mode brake control signal.

2. A brake signal conversion device as recited in claim 1, wherein said first detector means comprises first switch means for controlling the connection of said second mode brake control signal to said second conversion means, said first switch means including:
   (a) first relay means energized when said first mode brake control signal is present; and
   (b) normally closed contact means of said first relay means for interrupting said connection of said second mode brake control signal to said second conversion means in response to said energization of said first relay means.

3. A brake signal conversion device as recited in claim 2, wherein said second detector means comprises second switch means for controlling the connection of said first mode brake control signal to said first conversion means, said second switch means comprising:
(a) a second relay energized when said second mode brake control signal is present; and
(b) a normally closed contact of said second relay for interrupting said connection of said first mode brake control signal to said first conversion means in response to said energization of said second relay.

4. A brake signal conversion device as recited in claim 3, wherein said second switch means further comprises a normally open contact of said second relay in series with said normally closed contact means of said first relay means.

5. A brake signal conversion device as recited in claim 4, wherein said second relay is connected between said normally closed contact of said first relay means and said normally open contact of said second relay.

6. A brake signal conversion device as recited in claim 5, further comprising comparator means connected in series with said second relay for effecting said energization thereof when said second mode brake control signal is present.

7. A brake signal conversion device as recited in claim 3, wherein said second signal conversion means comprises:
(a) pneumatic to electric transducer means for converting said second mode brake control signal from a pneumatic analog pressure signal to an analog electric signal; and
(b) a comparative logic circuit that receives said analog electric signal from said pneumatic to electric transducer means and outputs said first mode brake control signal in binary code form.

8. A brake signal conversion device as recited in claim 7, further comprising comparator means connected in series with said second relay for effecting said energization thereof when said mode brake control signal level exceeds a predetermined percentage of the maximum value of said second mode brake control signal.

9. A brake signal conversion device as recited in claim 8, wherein said predetermined percentage corresponds to said first mode brake control signal provided during the first binary level of said binary code signal.

10. A brake signal conversion device as recited in claim 7, further comprising a multi-wire control line connected to said comparator logic circuit via which said first mode brake control signal is transmitted in said binary code form.

11. A brake signal conversion device as recited in claim 7, wherein said first switch means further comprises means for delaying de-energization of said first relay means for a predetermined duration following disappearance of said first mode brake control signal.

12. A brake signal conversion device as recited in claim 11, wherein said delay means comprises an r-c timing network in parallel with said first relay means.

13. A brake signal conversion device as recited in claim 10, wherein said second relay is connected to said multi-wire control line.

14. A brake signal conversion device as recited in claim 13, wherein said second switch means further comprises a normally open multi-contact armature of said second relay having a contact in each wire of said multi-wire control line in parallel with said second relay connection with said multi-wire control line.

15. A brake signal conversion device as recited in claim 6, wherein said second signal conversion means further comprises:
(a) a single control wire via which said second mode brake control signal is transmitted as an analog electrical signal;
(b) a comparative logic circuit that receives said analog electric signal from said pneumatic to electric transducer means and outputs said first mode brake control signal in binary code form,
(c) a multi-wire control line connected to said comparative logic circuit via which said first mode brake control signal is output;
(d) said first relay means comprising a plurality of relays, each connected to a respective wire of said multi-wire control line; and
(e) said normally closed contact means of said first relay means being a contact of each said relay connected in series in said control wire via which said second mode brake control signal is transmitted.

16. A brake signal conversion device as recited in claim 15, wherein said normally open contact of said second relay is a multi-contact armature, each contact of which is in a respective wire of said multi-wire control line.

17. A brake signal conversion device as recited in claim 5, wherein said second signal conversion means further comprises:
(a) a single control wire via which said second mode brake control signal is transmitted as an analog electrical signal;
(b) a comparative logic circuit that receives said analog electric signal from said pneumatic to electric transducer means and outputs said first mode brake control signal in binary code form;
(c) a multi-wire control line via which said first mode brake control signal is output from said comparative logic circuit;
(d) said first relay means comprising a plurality of relays, each said relay being connected to a respective wire of said multi-wire control line;
(e) said normally open contact of said second relay being a multi-contact armature, each contact of which is in a respective wire of said multi-wire control line; and
(f) said second relay being connected to each wire of said multi-wire control line in parallel with said normally open contacts of said second relay.

18. A brake signal conversion device as recited in claim 6, wherein said second signal conversion means further comprises:
(a) pneumatic to electric transducer means for converting said second mode brake control signal from a pneumatic analog pressure signal to an analog electric signal; and
(b) a single control wire via which said analog electric signal is conducted to provide said first mode brake control signal.

* * * * *